(12) United States Patent
Mottram et al.

(10) Patent No.: US 9,620,024 B1
(45) Date of Patent: Apr. 11, 2017

(54) PLANNED FLIGHT TRACKING AND DIVERT ALERTING THROUGH THE EMPLOYMENT OF TRUSTED AUTOMATIC DEPENDENT SURVEILLANCE-BROADCAST (ADS-B) POSITION REPORTING SYSTEM

(71) Applicant: ROCKWELL COLLINS, INC., Cedar Rapids, IA (US)

(72) Inventors: Adam Mottram, Dorking (GB); Brian Creswell, Horley (GB); Rolf R. Stefani, West River, MD (US); James Gary Cooper, Jr., Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 8 days.

(21) Appl. No.: 14/711,744

(22) Filed: May 13, 2015

(51) Int. Cl.
  *G08G 5/00* (2006.01)
  *G01S 5/02* (2010.01)
  *G01S 19/13* (2010.01)

(52) U.S. Cl.
  CPC .......... *G08G 5/0073* (2013.01); *G01S 5/0294* (2013.01); *G01S 19/13* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,234,020 B1* | 7/2012 | Wichgers | ............... | G01O 5/005 701/9 |
| 8,665,121 B2* | 3/2014 | Shavit | ............... | G08G 5/0043 340/945 |
| 8,688,101 B1* | 4/2014 | Hayes | ............... | H04W 4/02 370/230 |
| 8,712,744 B1* | 4/2014 | Sampigethaya | ......... | G08G 5/00 701/120 |
| 9,221,553 B1* | 12/2015 | Mitchell | ............... | B64D 45/00 |
| 9,274,521 B1* | 3/2016 | Stefani | ............... | G08G 5/0026 |
| 2003/0060941 A1* | 3/2003 | Griffith | ............. | B64D 45/0015 701/3 |
| 2003/0137444 A1* | 7/2003 | Stone | ................... | G08G 5/0008 342/30 |
| 2010/0103022 A1* | 4/2010 | Stefani | ............... | G08G 5/0013 342/30 |

(Continued)

*Primary Examiner* — Jonathan L Sample
(74) *Attorney, Agent, or Firm* — PRASS LLP

(57) ABSTRACT

A system and method are provided for integrating live flight following information provided as Trusted Automatic Dependent Surveillance-Broadcast (ADS-B) data with stored planned flight and other information, and for, in part, comparatively analyzing the data/information to generate automated alerts to one or more end-users when an aircraft is determined to deviate from a planned flight route by a predetermined degree, as specified by adjustable set parameters. Broadcast ADS-B data transmitted by participating aircraft is collected and communicated via a secure, trusted and dependable worldwide network for analysis in a centralized location. The analysis involves, in part, comparing the ADS-B data to other information provided to, or collected by, the centralized location from multiple sources regarding planned routes of flight for participating aircraft and other available information relevant to aircraft operations in particular geographic locations. Alerts regarding identified discrepancies or deviations are generated and communicated to stakeholders.

22 Claims, 3 Drawing Sheets

(56) References Cited

U.S. PATENT DOCUMENTS

| | | | | |
|---|---|---|---|---|
| 2011/0163908 A1* | 7/2011 | Andersson | G01S 5/0072 | 342/36 |
| 2013/0144518 A1* | 6/2013 | Dacre-Wright | B64C 19/00 | 701/121 |
| 2013/0265187 A1* | 10/2013 | Hall | G01S 13/9303 | 342/37 |
| 2014/0024395 A1* | 1/2014 | Johnson | H04W 4/02 | 455/456.3 |
| 2014/0081483 A1* | 3/2014 | Weinmann | G08G 5/0021 | 701/14 |
| 2014/0257692 A1* | 9/2014 | Stefani | G01C 21/00 | 701/519 |
| 2014/0309817 A1* | 10/2014 | Burgin | B64D 45/00 | 701/3 |
| 2014/0327564 A1* | 11/2014 | Sampigethaya | H04L 9/3215 | 342/32 |
| 2015/0017609 A1* | 1/2015 | Leao | G09B 9/08 | 434/30 |
| 2015/0057915 A1* | 2/2015 | La Civita | G08G 5/0026 | 701/120 |
| 2015/0170524 A1* | 6/2015 | Stefani | G08G 5/0013 | 701/120 |
| 2015/0277440 A1* | 10/2015 | Kimchi | G01S 17/08 | 701/26 |
| 2015/0379876 A1* | 12/2015 | Navot | G08G 5/0021 | 701/301 |
| 2016/0101855 A1* | 4/2016 | Stefani | G08G 5/0008 | 701/2 |
| 2016/0125744 A1* | 5/2016 | Shamasundar | G08G 5/0039 | 701/122 |
| 2016/0155342 A1* | 6/2016 | Gibson | G01S 5/0054 | 701/409 |
| 2016/0196755 A1* | 7/2016 | Navot | G05D 1/0676 | 701/4 |

* cited by examiner

PLANNED FLIGHT TRACKING AND DIVERT ALERTING THROUGH THE EMPLOYMENT OF TRUSTED AUTOMATIC DEPENDENT SURVEILLANCE-BROADCAST (ADS-B) POSITION REPORTING SYSTEM

BACKGROUND

1. Field of the Disclosed Embodiments

This disclosure relates to systems and methods for monitoring and integrating live flight following information provided as Trusted Automatic Dependent Surveillance-Broadcast (ADS-B) data with stored planned flight information, and for comparatively analyzing the data/information to generate automated alerts to one or more end-users or stakeholders in instances when an aircraft deviates from a planned flight route by a predetermined degree, as specified by adjustable set parameters.

2. Related Art

Many individuals and entities familiar with the vagaries of commercial and business aviation worldwide watched in stunned amazement in March 2014 the news reports regarding the physical "disappearance" of Malaysia Airlines Flight 370. Still seeking answers regarding that tragedy, the public worldwide was rocked by news regarding the fate of Germanwings Flight 9525 in March 2015 in which the co-pilot allegedly locked the captain out of the cockpit and further allegedly deliberately commanded a descent that caused the aircraft to crash into a mountain killing all onboard.

To many, it seems implausible that real-time movements of commercial airliners and other aircraft for hire are not meticulously tracked along their planned routes of flight. With the occurrence of each incident, commercial news outlets clamor to find industry "experts" that can attempt to explain to the general public the current inability to geo-locate, for example, a site at which a commercial airliner could have "gone down" and/or simply disappeared, or to identify, in a time-critical manner, potentially drastic hazards caused by purposeful deviation from a planned route of flight.

Every time such a highly publicized event, particularly one involving a commercial airliner, occurs, the aviation community, often in response to an outcry from the general public, increases efforts at finding some additional technologic solution by which seamless, precise and timely aircraft flight following worldwide may be more effectively implemented. Discussion is undertaken regarding how to eliminate "dead zones" in extreme areas of open ocean and, for example, near the North and South Pole. In the case of the Germanwings incident, many asked whether there was some manner by which drastic, or even subtle, deviations from planned flight routing may be identified externally, and in a manner that may potentially afford opportunities for rapid response scenarios to be implemented to address the deviations. In this regard, many questions arise regarding an ability to detect deviations in aircraft flight profiles with respect to planned routes of flight in a manner that could alert controlling agencies and/or the entities that own and operate the aircraft as to the deviations from the intended routes of flight in a timely enough manner that some communication with the deviating aircraft is attempted, or some other intervention scheme is effected.

While it is recognized that intentionally initiated actions by "rogue" flight deck crew members may be difficult to interdict, the sooner an indication of such an action may be isolated, the sooner some reactive response may be able to be put in place. It should also be recognized that certain mechanical failures and avionics difficulties may cause a particularly ascertainable deviation of which even alert aircrew may be limitedly aware. In this latter category, consider for example, the incident in October 1999, in which a famous professional golfer died in what was later determined to be some manner of cabin depressurization incident involving the business jet in which he was flying from Florida to Texas. Three minutes after a last communication was received from the aircraft, it made a right turn that was deemed likely to be the result of human input. Three minutes later, however, the aircraft did not respond to radio communication and there was no further communication with the aircraft. Based on position of the aircraft when radio contact was lost, movements of that particular aircraft were able to be continually tracked. Military jets were scrambled and it was only through the observation of the military pilots, observing what may have been frost or condensation on the windshield that evidence of the cause for the deviation was ascertained. The aircraft continued flying until it ran out of fuel and crashed into a field near Mina, S. Dak. Depending on the circumstances surrounding an aircraft route of flight deviation occurrence, it is rare that the detailed information regarding an incident such as this may be so readily available.

Any deviations from flight planned routes in controlled and uncontrolled airspace segments, even when those deviations do not result in catastrophe, can be very disruptive to aircraft operations in a vicinity of the deviating aircraft. Safe separation distances, in three dimensions, become difficult to maintain in a vicinity of even a single aircraft making unpredicted deviations from, or even along, its flight planned route. Based on this, there are certain restrictions and/or active intervention measures that may be imposed/undertaken on directions from, for example, an air traffic control facility to maintain what may be considered acceptable deviations, or deviations within acceptable limits. Timing deviations may be limited, for example, to less than three minutes along a route of flight in which timing/sequencing inputs may be limited to voice reports from the aircraft passing mandatory reporting checkpoints. Deviations in altitude may be even more restrictive to maintain safe separation of aircraft in the local vertical for the aircraft.

SUMMARY OF DISCLOSED SUBJECT MATTER

Tracking information is today, and will increasingly in the future be, provided by Automatic Dependent Surveillance-Broadcast (ADS-B) systems transmitting data from participating aircraft to myriad receiver locations. ADS-B data transmissions contain fairly fine grained data on locations and operations of aircraft, as well as information, which if properly analyzed may allow for some real time assessment of the local environment within which particular participating aircraft are operating at any given time. Today, received ADS-B data is parsed, much of it is discarded, and the aircraft position-representative information (which is only a small percentage of the available ADS-B data) is passed along via coordinating nodes to display devices that varyingly passively display the received ADS-B aircraft position data in real time, or near real-time, for aircraft operating in radar-controlled and non-radar-controlled airspace.

Conventionally, no additional (particularly predictive) analysis is undertaken of the received ADS-B data as it is passed from the participating aircraft via the coordinating nodes to a variety of display components. For example, not even rudimentary conflict prediction, flow management or arrival computation, which could be used for alerting end-users or stakeholders, is undertaken. In short, there is an expanse of high fidelity aircraft position keeping and aircraft operating data, passed in a normalized form as ADS-B data message elements, that is currently overlooked, but may be usable to form the basis for other data analysis (including comparative analysis) in support of safer aircraft operation worldwide.

It is anticipated that an ability to analyze the available data and to provide, where appropriate, immediate results of that analysis in some manner of alerting scheme may fill a critical and unmet need in reporting, and predicting, a location of an aircraft in flight anywhere in the world. This analytic ability may additionally be employed to alert individual stakeholders, in a near real-time basis, as to critical deviations of aircraft from their intended routes of flight, and/or critical deviations in the functioning of monitored aircraft operating systems, installed avionics systems, and other key component systems necessary to the safe conduct of aircraft flight operations.

Such an analytic monitoring capability may be deemed invaluable to myriad aviation-related end-users and stakeholders. These end-users or stakeholders may include, for example, air navigation service providers (ANSPs) worldwide, whether they are governmental departments/agencies, state-owned companies, corporations or other entities, or private/commercial organizations. The end users or stakeholders may also include commercial airline companies, business jet service providers, military aviation-related entities, organizations involved in aviation search and rescue, and the like. An ability to pinpoint aircraft flight deviations, and potentially to project a position of a particular aircraft, may aid agencies and entities in monitoring aircraft operations for myriad beneficial purposes ranging from simple flight following to predictions of consequential deviations that may require additional inquiries and/or actions to avoid mishaps or other dangerous conditions.

In an event that a mishap occurs, the ability to pinpoint the position of the particularly-involved aircraft, and to supplement the analysis of the recovered aircraft "black boxes" with an externally-undertaken and provided analysis of available ADS-B data when the mishap occurred, may significantly accelerate the mobilization of assets in response, and to better verify causes of, and/or sequences of events that led to, the mishap.

In short, an ability to sense and measure a deviation of an aircraft as exceeding a certain threshold from the flight planned route for the aircraft may provide a first level of indication of a difficulty with the aircraft and/or its operation in real time, or near real-time.

ADS-B data received from participating aircraft, particularly as ADS-B data reporting becomes mandatory and more expansive, may provide myriad separate elements of analyzable data to detect deviations and to assess a magnitude of those deviations, as well as an ability to analyze operations of critical aircraft/avionics components. The provided ADS-B data may support other analysis efforts in real time, such as an analysis of the operating environment surrounding the aircraft, to provide additional beneficial information to myriad stakeholders.

It would be advantageous, in view of the absolute necessity to maintain safe separation distances and the desire to monitor other aircraft operations, to provide systems and methods that could collect all, or substantially all, of the available ADS-B data received from participating aircraft worldwide using a trusted, dependable collection and communication network. This data could be integrated with other available information regarding aircraft operations, such as, for example, flight plan information, enroute weather information and other like information, and could be analyzed independently or as a package with other integrated information, to determine deviations and/or trends that may be usable to immediately alert appropriate end-users and/or stakeholders to deviations from intended routes of flight.

Exemplary embodiments of the systems and methods according to this disclosure may capture and collect broadcast ADS-B data transmitted by participating aircraft, via a secure, trusted and dependable worldwide network, for analysis of that data in one or more centralized locations.

Exemplary embodiments may provide schemes by which to analyze the ADS-B data by comparing it to information provided to, or collected by, the centralized location from multiple sources regarding planned routes of flight for the participating aircraft and other available information relevant to the operations of aircraft in a particular geographic location.

In embodiments, a real-time analysis may be undertaken to expeditiously identify aircraft avionics systems discrepancies or deviations from the planned flight information.

Exemplary embodiments, once identifying a discrepancy or deviation, may provide an alert regarding the identified discrepancy or deviation to local or remote end-users or stakeholders in order, for example, to allow the local or remote end-users or stakeholders to initiate one or more of further inquiries into circumstances associated with the identified discrepancy or deviation, and actions in remediation of, or recovery from, the identified discrepancy or deviation.

Exemplary embodiments may capture currently-unused elements of ADS-B data for analysis. ADS-B receivers do now, or soon will, capture transmitted data in as many as nineteen different message element fields. Typically, only two of the message elements involving position reporting information are used by ground-based ADS-B receiving and reporting stations/systems. In embodiments, all or virtually all of the many available ADS-B message elements may be collected and analyzed to increase a fidelity and/or spectrum of system outputs.

Exemplary embodiments may capture multiple source data to compare with the captured and collected ADS-B data in order to qualify the ADS-B data.

Exemplary embodiments may extract information for meteorological analysis to supplement the analysis of particular flight deviations in real-time.

Exemplary embodiments may convert or translate the analyzed data into a graphical format for direct integration into one or more situational awareness display components without further translation at the receiving nodes housing the situational awareness display components. Situational awareness display components may constitute alerting services, or may supplement alerting services to individual end-users or stakeholders regarding aircraft deviations from planned routes.

Exemplary embodiments may afford an end-user or stakeholder an opportunity to establish their own limits of an acceptable deviation for a set of circumstances.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for monitoring and integrating live flight following information provided as Trusted ADS-B data with stored planned flight information and for comparatively analyzing the data to generate automated alerts to one or more end-users or stakeholders when an aircraft deviates from a planned flight route by a predetermined degree, as specified by set parameters, will be described, in detail, with reference to the following drawings, in which.

DESCRIPTION OF DISCLOSED EMBODIMENTS

Figure 1:
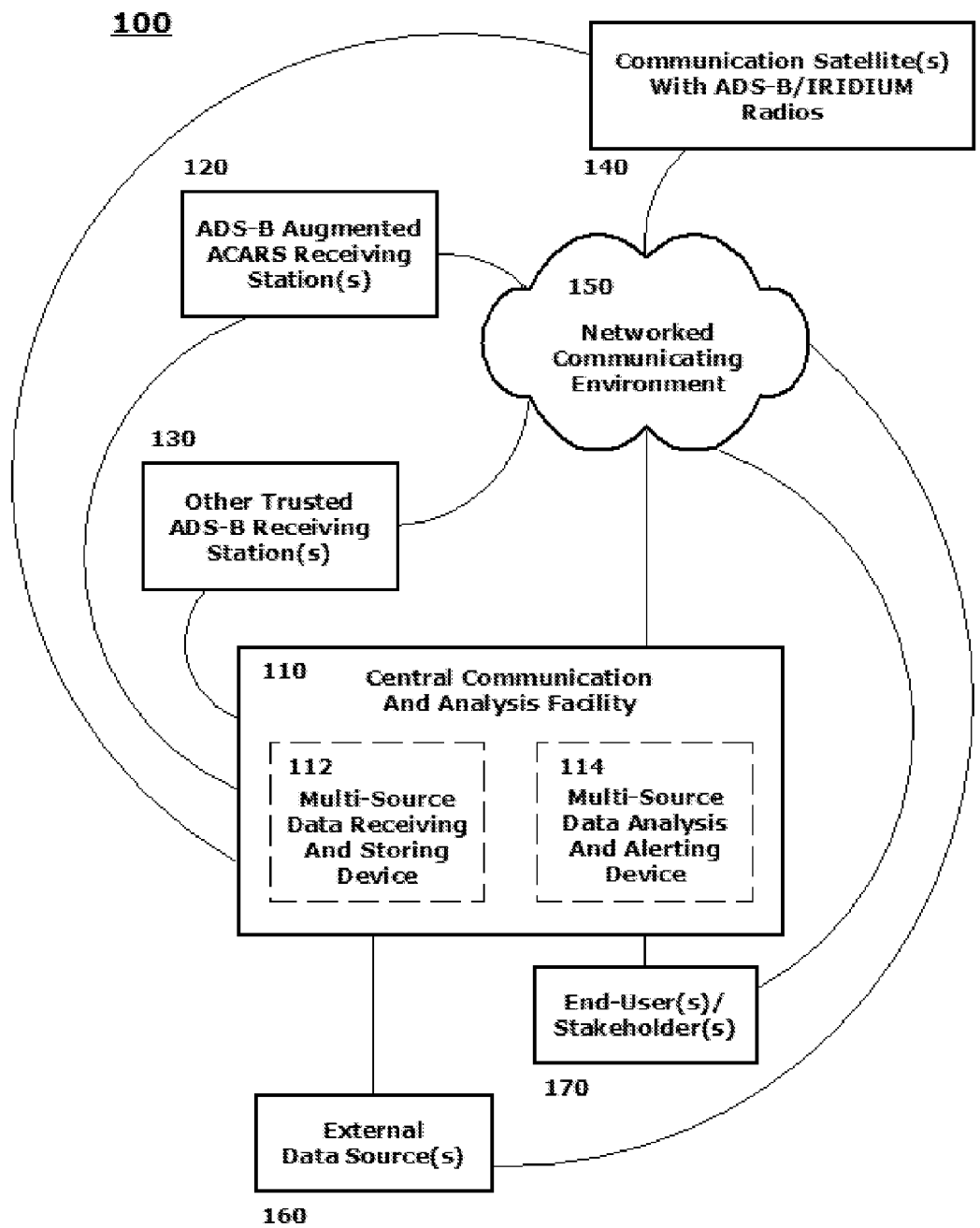
FIG. 1 illustrates an exemplary overview of an operating environment in which the Trusted ADS-B data acquisition, integration, analysis and alerting schemes with regard to participating aircraft in flight worldwide may be implemented according to this disclosure.

The disclosed systems and methods for monitoring and integrating live flight following information provided as Trusted ADS-B data with stored planned flight information and for comparatively analyzing the data to generate automated alerts to one or more end-users or stakeholders when an aircraft deviates from a planned flight route by a predetermined degree as specified by variable set parameters, will generally refer to this specific utility for those systems and methods. Exemplary embodiments will be described in this disclosure as being particularly adaptable to use in advanced ADS-B data analysis for aircraft flight following, the analysis collecting and resolving real-time, or near real-time, deviations of aircraft from flight planned routes and in alerting end-users/stakeholders to such deviations as exceed certain parameters set locally or by the end-users/stakeholders. These descriptions should not be interpreted as specifically limiting the disclosed schemes to any particular configuration of a system for implementing such an advanced aircraft flight following scheme, or as requiring all of the data elements available in a particular ADS-B data generation configuration. In fact, the systems and methods according to this disclosure may be equally applicable to other forms of vehicle position deviation monitoring given a correct combination of ADS-B data elements and analysis of those elements generally in the manner described below. Further, based on the detail of the data available in ADS-B data messaging, and generally currently unused other than for position keeping, other analytic products may be obtained at the request or requirement of other end-users/stakeholders. Any particular capacity for analyzing ADS-B data, particularly as that data is reported to a centralized communication and analysis facility via a secure, dependable network for integration with other pertinent all-source information and reporting to end-users and/or stakeholders is contemplated as being covered by this disclosure.

Specific reference, for example, to the above-discussed real-world scenarios to which the systems and methods according to this disclosure may have been particularly adaptable in the past are provided as examples of operational incidents that motivated the inventors to arrive at the disclosed advanced Trusted ADS-B data based systems and methods for performing high level comparative analysis to assess aircraft deviations with respect to available flight planning information. These examples are not intended to limit the disclosed subject matter in any manner. Additionally, reference is made above, and specific description will be included below, to certain data elements provided in ADS-B data transmitted from participating aircraft in flight that may be advantageously usable to implement the disclosed schemes. These references as well are intended to provide an overview of the types of data elements that may be particularly usable in carrying into operational effect the disclosed schemes.

The involved analysis may make use of certain of the data elements. This is not intended to imply that any of the particular data elements is necessarily more important than any of the other data elements. Those of skill in the art will recognize that the disclosed scheme may be beneficially used to analyze information provided in all of the ADS-B data elements in a manner that may be beneficially employed by one or more end-users and/or stakeholders.

Any specificity in the disclosed references should be understood as being exemplary only, and not limiting the disclosed schemes, in any manner, to any particular communication link or protocol (a) between ADS-B data sources of differing configurations and a centralized communication and analysis facility or (b) between the centralized communication and analysis facility any one or more of the end-users and/or stakeholders in implementing the disclosed schemes.

Additionally, the disclosed schemes may provide properly formatted information that is directly integrated as an alert stream into graphical display components operated by the end-users and/or stakeholders. Such graphical display components may operate according to any one or more of ARINC GLOBALink$^{SM}$ WebASD$^{SM}$, ARINC GLOBALink$^{SM}$ Skyview$^{SM}$, and ARINC GLOBALink$^{SM}$ WebUAS$^{SM}$ protocols as examples of commercially available graphical mapping and/or situational awareness display products that may be adaptable to receive the disclosed alerts. Although the systems and methods according to disclosure may be particularly adaptable for use in, or as a supplement to, these graphical mapping and/or situational awareness display products, these are but examples of the types of tools that an end-user and/or stakeholder may employ to display alerts or other information generated as a result of the disclosed analytic schemes.

Features and advantages of the disclosed embodiments will be set forth in the description that follows, and will be, at least in part, obvious from the description, or may be learned by practice of the disclosed embodiments. The features and advantages of the disclosed embodiments may be realized and obtained by means of the instruments and combinations of features particularly pointed out in the appended claims.

Various embodiments are disclosed and discussed in detail below. While specific implementations are discussed, it should be understood that this is done for illustration purposes only. A person skilled in the relevant art will recognize that other components and configurations may be used without departing from the spirit and scope of the disclosed embodiments.

Those of skill in the art recognize that ADS-B represents a cooperative surveillance technology in which an aircraft (1) determines its (own ship) position by satellite navigation (GPS) and other related flight information from other onboard radios, data collection and/or geolocation systems, and (2) periodically broadcasts the own ship position to cooperating ADS-B receivers enabling the aircraft to be tracked in real time or near-real time. The positional information may be received by ATC ground stations or by others with ADS-B receivers, and is generally considered and implemented as a replacement for secondary radar for aircraft tracking and position keeping. ADS-B generated aircraft positional information may be received by other cooperating aircraft to provide situational awareness in aircraft operating proximately to one another in support of traffic separation, conflict avoidance and overall flight safety. ADS-B is automatic in the sense that no pilot or controller action is required for the information to be issued. It is dependent surveillance in the sense that the surveillance-type information so obtained depends on the suitable navigation and broadcast capability in the source aircraft.

The disclosed schemes may advantageously employ all modes, transmission protocols and data elements available from aircraft-mounted ADS-B systems. These include ADS-B receivers capable of receiving both 1090 MHz and 978 MHz ADS-B signals. The 1090 MHz signal carries what is commonly referred to 1090 Extended Squitter (ES) traffic, while the 978 MHz signal carries what is commonly referred to as 978 and/or Universal Access Transceiver (UAT) traffic. Generally, 1090 ES is accepted inside the US for altitudes above 18,000 feet (and internationally for all altitudes). ES receivers detect other aircraft with ES transmitters air-to-air, and receive other traffic information uplinked from ADS-B-equipped ground stations. A limitation of 1090 ES is that this ADS-B signal provides no weather data link. 978 UAT is only available in the US, and only for altitudes below 18,000 feet. As with 1090 ES receivers, 978 UAT receivers can detect other airplanes with transmitters on the same frequency air-to-air and also receive other traffic information uplinked from ADS-B equipped ground stations.

Weather information may also be transmitted over 978 MHz for certain participating aircraft, but only from the ground to the aircraft as, for example, Flight Information Services-Broadcast (FIS-B) data. FIS-B is a ground-to-air broadcast service of weather and other non-control, aeronautical information that allows pilots to operate more safely and efficiently.

Similarly, Traffic Information Service-Broadcast (TIS-B) is a service intended to improve a pilot's ability to visually see other traffic in the air and on the airport surface so that pilots can more effectively apply traditional "see-and-avoid" techniques. TIS-B is an information only system that does not provide any manner of collision avoidance alert and is not intended to be relied upon to initiate avoidance maneuvering in instances where, for example, visual cues are unavailable. TIS-B too is a ground-based broadcast service that provides secondary surveillance radar-derived traffic data to provide ADS-B In equipped aircraft with a more complete traffic picture in situations where all other nearby aircraft are not equipped with ADS-B.

ADS-B systems capture much more than aircraft position data. ADS-B receivers capture data in more than a dozen different data fields. In 2010, the U.S. Federal Aviation Administration amended 14 C.F.R. Part 91, for example, to include new §91.225, entitled Automatic Dependent Surveillance-Broadcast (ADS-B) Out equipment and use, and new §91.227, entitled Automatic Dependent Surveillance-Broadcast (ADS-B) Out equipment performance requirements. In certain airspace in the U.S. after 2020, according to §91.227(d), entitled "Minimum Broadcast Message Element Set for ADS-B Out," participating aircraft will need to be able to broadcast ADS-B in as many as nineteen specified data element fields as follows: (1) Length and width of the aircraft; (2) Aircraft latitude and longitude; (3) Aircraft pressure altitude; (4) Aircraft velocity; (5) and (6) Indications regarding installed TCAS II or ACAS equipment in the aircraft; (7) An indication of the Mode 3/A transponder code specified by ATC; (8) An indication of the aircraft call sign or registration number [with specified exceptions]; (9) Flight crew initiated indications of an emergency, a radio communication failure, or an unlawful interference; (10) An indication of the aircraft "IDENT" to ATC; (11) An indication of the aircraft assigned ICAO 24-bit address [with specified exceptions]; (12) An indication of the aircraft emitter category; (13) An indication of whether an ADS-B In capability is installed; (14) An indication of the aircraft geometric altitude; and (15)-(19) Indications of the Navigation Accuracy Category for Position (NACP), the Navigation Accuracy Category for Velocity (NACV), the Navigation Integrity Category (NIC), the System Design Assurance (SDA), and the Source Integrity Level (SIL) (each of which is a defined term).

A Trusted ADS-B monitoring and analysis scheme implemented by the disclosed systems and methods may be able to leverage the complete storehouse of knowledge regarding aircraft operations to do more than simply passively depict aircraft positions. In the Germanwings example, such a system may have detected that an altitude command was input that was lower than a minimum enroute/safe altitude (MEA/MSA) in an operating vicinity of an aircraft. The available fidelity of avionics data is, or could be, made leveraged by the disclosed schemes for real time or near-real time analysis in time to step up the initiation of responsive actions. Inexpensive COTS ADS-B receiving and reporting systems may not even collect the elements of the ADS-B information beyond position reporting, or may collect and discard those elements. These message elements for avionics status and/or flight status (e.g., altitude changes) may be useful according to the disclosed systems to be collected, analyzed and employed.

The disclosed schemes may collect flight planning information from myriad available sources and provided comparative analysis of the actual operations of an aircraft with the applicable flight planning information for the particular flight in order to assess according to an end-user or stakeholder's deviations that may raise cause for concern. Other entities that are not currently able to employ elements of this data in a meaningful way may be provided as analyzed data to their specific needs. The United Kingdom meteorological office, for example, has expressed an interest in obtaining trusted ADS-B data for weather reporting, forecasting, and trend analysis. The analysis may include, for example, crowd-sourcing of available data from ADS-B transmitters in participating aircraft in a particular geographic area. Archiving all the information may provide an opportunity to compare individual data elements to a particular end-user's or stakeholder's beneficial use. A specific example may be collecting a measured change in aircraft latitude/longitude over a period of time and an aircraft sensed velocity (airspeed) to determine winds aloft. The disclosed schemes may provide data that could supplement and potentially ultimately replace data that is currently collected with the deployment of instrumented weather balloons, which are expensive non-recoverable assets.

The disclosed schemes may continually, or discretely monitor a plurality of trusted ADS-B data sources to acquire the full breadth of available ADS-B provided data from participating aircraft. The disclosed schemes may collect and communicate the monitored ADS-B data via a secure and/or proprietary network to a centralized location where the ADS-B data may be stored, integrated with other available information from multiple external sources, and analyzed (in a comparative manner, where appropriate). Results of the analysis may be locally employed to generate alerts and the results and/or the alerts may be communicated to end-users and/or stakeholders in a manner that is usable to those entities.

Rockwell-Collins (ARINC) bring a unique proprietary data collection and analysis opportunity based on received ADS-B data. The existing Aircraft Communications Addressing and Reporting System (ACARS) involves a network of ground stations worldwide that may be modified to house or integrate ADS-B receivers, and an existing global secure, trusted and dependable communication network. A dedicated ADS-B aircraft data collection system may be provided riding the existing communication backbone to collect the ADS-B data from ground stations virtually anywhere in the world to provide that data to a centralized communication and analysis capability. End-users and/or stakeholders operating adapted display components are able to connect to the collector/server and passively monitor all ADS-B data on all ground stations or specific traffic as filtered, when appropriate.

No comparative analysis is currently undertaken with respect to collected ADS-B data. The disclosed schemes may provide a warehouse to store all of the message elements that are not collected and stored today. Additionally, a first level analysis is undertaken to provide a package of useful information regarding deviations from planned flight routes, atmospherics in a vicinity of a particular one or more aircraft, and other like beneficial information. Flight planning data, and other data (voice position reports, for example), are available from myriad data sources and in disparate databases, to support the analytics of real-time collected ADS-B data to determine a broad scope of deviations, and other performance parameters that may differ from the norm or otherwise inform situational awareness with respect to one or more aircraft operating in a vicinity. Coverage gaps that may not be filled with ground-based ADS-B receiver installations, e.g., open ocean reception, may be filled through smart employment of, for example, Iridium ADS-B leveraging existing SATCOM and HF data feeds. Armed with all of the available information a high speed comparison, alerting, and reporting to any one of a series of end-users or stakeholders. This is a capability that it not currently available.

FIG. 1 illustrates an exemplary overview of an operating environment 100 in which the Trusted ADS-B data acquisition, integration, analysis and alerting schemes with regard to participating aircraft in flight worldwide may be implemented according to this disclosure. As shown in FIG. 1, the exemplary operating environment 100 involves myriad lines of communication (wired or wireless) between a central communication and analysis facility 110, acting as a centralized all source data monitoring, collection, storing and analysis node, and a number of widely-dispersed communication nodes. The communications may be direct between the central communication and analysis facility 110 and the number of widely dispersed communication nodes, or may be via one or more networked communicating environments 150.

The widely-dispersed communication nodes may include a plurality of ADS-B data receiving nodes. The plurality of ADS-B data receiving nodes may be in a form of ADS-B augmented ACARS receiving stations 120, other ground-based trusted ADS-B receiving stations 130, and/or one or more communication satellites 140 equipped with an ADS-B and/or an ADS-B Iridium® radio, or other ADS-B communicating capability. It is intended that the plurality of ADS-B data receiving nodes may be integrated to provide a network of ADS-B receivers implementing essentially worldwide coverage. The systems and methods according to this disclosure leave open the possibility that additional forms and configurations of ADS-B receiver installations may be introduced and incorporated into the disclosed secure network that communicates with the central communication and analysis facility 110. As such, the disclosed schemes for collection, integration, communication and analysis of the information available from the multiple data sources will remain relevant despite the addition of new technologies and the presentation of newly-available ADS-B receiver technologies and installations including such technologies.

The widely-dispersed nodes may also include a plurality of external data sources 160 in communication with the central communication and analysis facility 110. The external data sources 160 may communicate with a multi-source data receiving and storing device 112 (which may be in the form of a central server including integrated data storage, or communicating with one or more supporting data storage devices) within the central communication and analysis facility 110. The communication between the external data sources 160 and the central communication and analysis facility 110 may be in the form of regularly broadcast information updates provided to the central communication and analysis facility 160, or otherwise may be responsive targeted queries initiated by the central communication and analysis facility 110. The communications between the external data sources 160 and the central communication and analysis facility 110 may be direct, or may be via the one or more networked communicating environments 150.

The widely-dispersed nodes may also include a plurality of end-user and/or stakeholder nodes 170 with which the central communication and analysis facility 110 may be in wired or wireless communication continuously, periodically or otherwise at discrete intervals. These end-user and/or stakeholder nodes may include, for example, air navigation service providers (ANSPs) worldwide, whether they are governmental departments/agencies, state-owned companies, corporations or other entities, or private/commercial organizations. The end-users and/or stakeholders may also include commercial airline companies, business jet service providers, military aviation-related entities, organizations involved in aviation search and rescue, and the like.

A premise behind the disclosed data collection and analysis schemes is that the central communication and analysis facility 110 will collect, analyze, and resolve real-time, near real time, and projected aircraft position or other discrepancies with reference to information supplied by, or collected from, the external data sources 160 to identify deviations and discrepancies in aircraft operations. The analysis may be conducted using a multi-source data analysis and alerting device 114 within the central communication and analysis facility 110 and may employ particular set parameters generated locally within the central communication and analysis facility 110, and/or provided by one or more of the end-users/stakeholders 170 to determine when a detected deviation or discrepancy becomes "reportable." In such instances, an alert may be generated and communicated to the end-users/stakeholders 170 directly or via one or more networked communicating environments 150.

Figure 2:
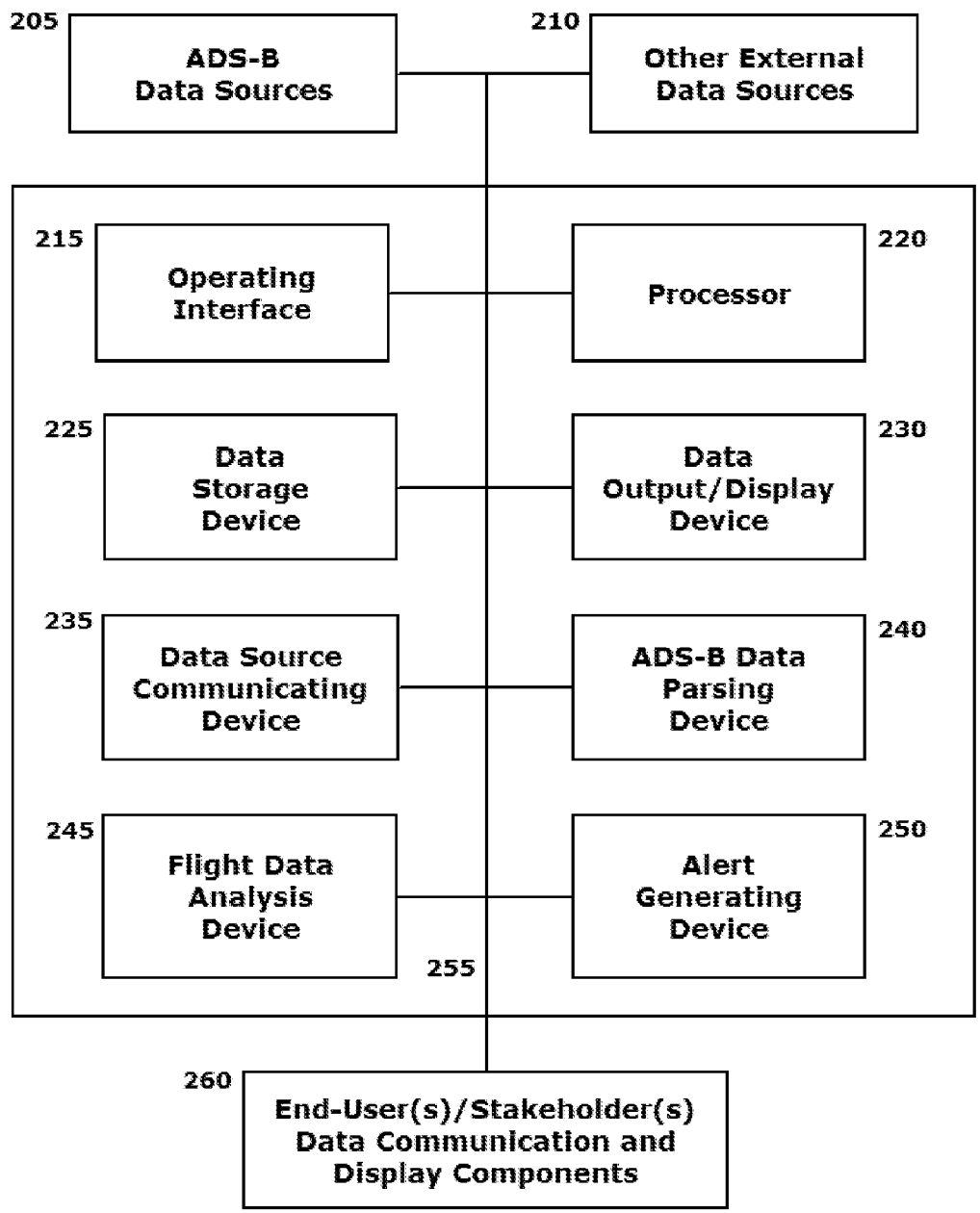
FIG. 2 illustrates an exemplary system for Trusted ADS-B data acquisition, integration, and analysis, and for generating and providing alerting with regard to aircraft in flight in a format usable by one or more end-users and/or stakeholders according to this disclosure.

FIG. 2 illustrates an exemplary system 200 for Trusted ADS-B data acquisition, integration, and analysis, and for generating and providing alerting with regard to aircraft in flight in a format usable by one or more end-users and/or stakeholders according to this disclosure. The exemplary system 200 shown in FIG. 2 may be implemented, in part, as one or more of a multi-source data receiving and storing device 112 and a multi-source data analysis and alerting device 114 in a central communication and analysis facility 110, as shown in FIG. 1, or may be implemented as a combination of system components associated with the central communication and analysis facility 110, including cloud-based processing and data storage components, which may be accessed remotely. In embodiments, the central communication and analysis facility 110 may implement the exemplary system 200 to coordinate the collection, secure communication, and analysis of ADS-B data collected from a network of closely-controlled ADS-B receivers in the manner discussed above to provide a level of secure, dependable and "trusted" ADS-B data communication and collection capability.

The exemplary system 200 may monitor and collect information from the plurality of ADS-B data sources (receivers) 205 deployed worldwide in the manner discussed above.

The exemplary system 200 may also collect information from myriad other external data sources 210 to provide, for example, baseline information, operating information and/or flight planning information to support the comparative analyses undertaken by the exemplary system 200 in carrying into effect the disclosed schemes.

The exemplary system 200 may include an operating interface 215 by which a user may communicate with the exemplary system 200 for directing at least a mode of operation of the exemplary system 200 in implementing the separate functions of the exemplary system 200 in performing the advanced aircraft flight following and alerting schemes discussed above. Control inputs received in the exemplary system 200 via the operating interface 210 may be processed and communicated to any one of the many connected nodes in communication with the central communication and analysis facility, including a plurality of ADS-B data sources 205, a plurality of other external data sources 210 and a plurality of end-user and/or stakeholder data communication and display components 260.

The operating interface 210 may be a part or a function of a graphical user interface (GUI) mounted on, integral to, or associated with, the exemplary system 200. The operating interface 210 may alternatively take the form of any commonly-employed user-interactive device by which a user may input and/or command an input to an automated processing system including, but not limited to, a keyboard or a touchscreen, a mouse or other pointing device, a microphone for providing verbal commands, or any other commonly-known operating interface I/O device.

The exemplary system 200 may include one or more local processors 220 for carrying out the individual operations and functions of the exemplary system 200. The processor 220 may reference, for example, each of the ADS-B data sources 205 or other external data sources 210 to monitor its accessibility via a data source communicating device 235 and to carry into effect the data collection functions discussed above via the data source communicating device 235. Separately or additionally, the processor 220 may be usable to control the disclosed analysis and alerting functions in the manner described.

The exemplary system 200 may include one or more data storage devices 225. Such data storage device(s) 225 may be used to store data or operating programs to be used by the exemplary system 200, and specifically the processor(s) 220 in carrying into effect the disclosed operations and functions. Data storage device(s) 225 may be used to store, for example, flight plan information received or retrieved from one or more of the other external data sources 210. Data storage device(s) 225 may be used to store all manner of information collected as ADS-B data elements from the ADS-B data sources 205 for use in the disclosed analytic and reporting schemes. As discussed in some detail above, an advantage of the disclosed schemes is that the vast amount of available ADS-B data may be collected and stored for many different types of analysis, including comparative analysis that has been, to date, unavailable.

The data storage device(s) 225 may include a random access memory (RAM) or another type of dynamic storage device that is capable of storing updatable database information, and for separately storing instructions for execution of system operations by, for example, processor(s) 220. Data storage device(s) 225 may also include a read-only memory (ROM), which may include a conventional ROM device or another type of static storage device that stores static information and instructions for processor(s) 220. Further, the data storage device(s) 225 may be integral to the exemplary system diagnostic device 200, or may be provided external to, and in wired or wireless communication with, the exemplary system 200, including cloud-based storage and/or processing elements.

The exemplary system 200 may include at least one data output/display device 230, which may be configured as one or more conventional mechanisms that output information to a user, including, but not limited to, a display screen on a GUI associated with the exemplary system 200 to provide feedback to a local user regarding operation of the exemplary system 200. The at least one data output/display device 230 may separately be configured as one or more of a local graphical situational awareness display component or a display device executing a mapping or situational awareness display application. In embodiments, the at least one data output/display device 230 may be configured to provide a local user with alert information based on a result of an analysis that determines that a detected deviation or discrepancy exceeds a specified set parameter. Such an alert may be displayed textually, graphically, or in any other manner that calls the attention of the user to the deviation or discrepancy.

As indicated briefly above, the exemplary system 200 may include at least one data source communicating device 235 in the form of an external data communication interface by which the exemplary system 200 may communicate with each of the ADS-B data sources 205, other external data sources 210, and the end-user/stakeholder data communication and display components 260. The at least one data source communicating device 235 may be particularly configured to support the communication with each of the respective external nodes either directly or via one or more intervening network communication nodes in a communication network.

The exemplary system 200 may include an ADS-B data parsing device 240, which may be a function of the processor 220 in communication with the data storage device 225, or may be a stand-alone device or unit within the exemplary system 200. The ADS-B data parsing device 240 may select certain elements of the ADS-B data collected by the exemplary system 200 to be specifically associated with particular flight planning information, or to be individually stored according to an overall data selection and storing scheme. The ADS-B data parsing device 240 may be essential to the cataloging of all of the data elements in the collected ADS-B data in a manageable form in one or more databases in one or more of the data storage devices 225 in order that the data can be efficiently accessed to perform one or more data analytic functions.

The exemplary system 200 may include a flight data analysis device 245, which may be a function of the processor 220 in communication with the data storage device 225, or may be a stand-alone device or unit within the exemplary system 200. The flight data analysis device 245 may select particularly-relevant elements of the ADS-B data parsed and stored by the ADS-B data parsing device 240. The flight data analysis device 245 may compare the selected data, for example, to available flight planning information regarding a particular flight under scrutiny to determine whether a deviation and/or discrepancy exists between actual and planned operations of a particular aircraft (including deviations from a flight planned route). Once a deviation and/or discrepancy is determined to exist, the flight data analysis device 245 may apply one or more stored, or otherwise available, set parameters to determine whether the deviation and/or discrepancy either now, or predictably in the future, exceeds an allowable limitation defined, or otherwise described, by the relevant set parameters. The flight data analysis device 245 may, in an automated manner autonomously or via the processor 220, initiate certain actions to address determined excessive deviations and/or discrepancies.

The exemplary system 200 may include an alert generating device 250, which may be a function of the processor 220 in communication with the data storage device 225, or may be a stand-alone device or unit within the exemplary system 200. The alert generating device 250 may generate some manner of textual, graphical or other indication of the determined excessive deviation and/or discrepancy by the flight data analysis device 245 and communicate the generated alert to one or more relevant end-user/stakeholder data communication and display devices 260 via, for example, the data source communicating device 235. The generated alert may be in a form that is supported by the relevant end-user/stakeholder data communication and display device 260, or may otherwise be in a form requested by the relevant end-user/stakeholder.

All of the various components of the exemplary system 200, as depicted in FIG. 2, may be connected internally, and potentially to a central communication and analysis facility when not housed within the central communication and analysis facility, by one or more data/control busses 255. These data/control busses 255 may provide wired or wireless communication between the various components of the exemplary system 200, whether all of those components are housed integrally in, or are otherwise external and connected to, the exemplary system 200.

It should be appreciated that, although depicted in FIG. 2 as an essentially integral unit, in communication with ADS-B data sources 205, the other external data sources 210 and the end-user/stakeholder communication and display devices 260 of the exemplary system 200, the various disclosed centralized elements of the exemplary system 200 may be arranged in any combination of sub-systems as individual components or combinations of components, integral to a single unit, or external to, and in wired or wireless communication with, the other centralized elements of the exemplary system 200. In other words, no specific configuration as an integral unit or as a support unit is to be implied by the depiction in FIG. 2. Further, although depicted as individual units for ease of understanding of the details provided in this disclosure regarding the components and component functions of the exemplary system 200, it should be understood that the described functions of any of the individually-depicted components may be undertaken, for example, by one or more processors 220 connected to, and in communication with, one or more data storage device(s) 225, all of which may support operations in the associated overall system.

Figure 3:
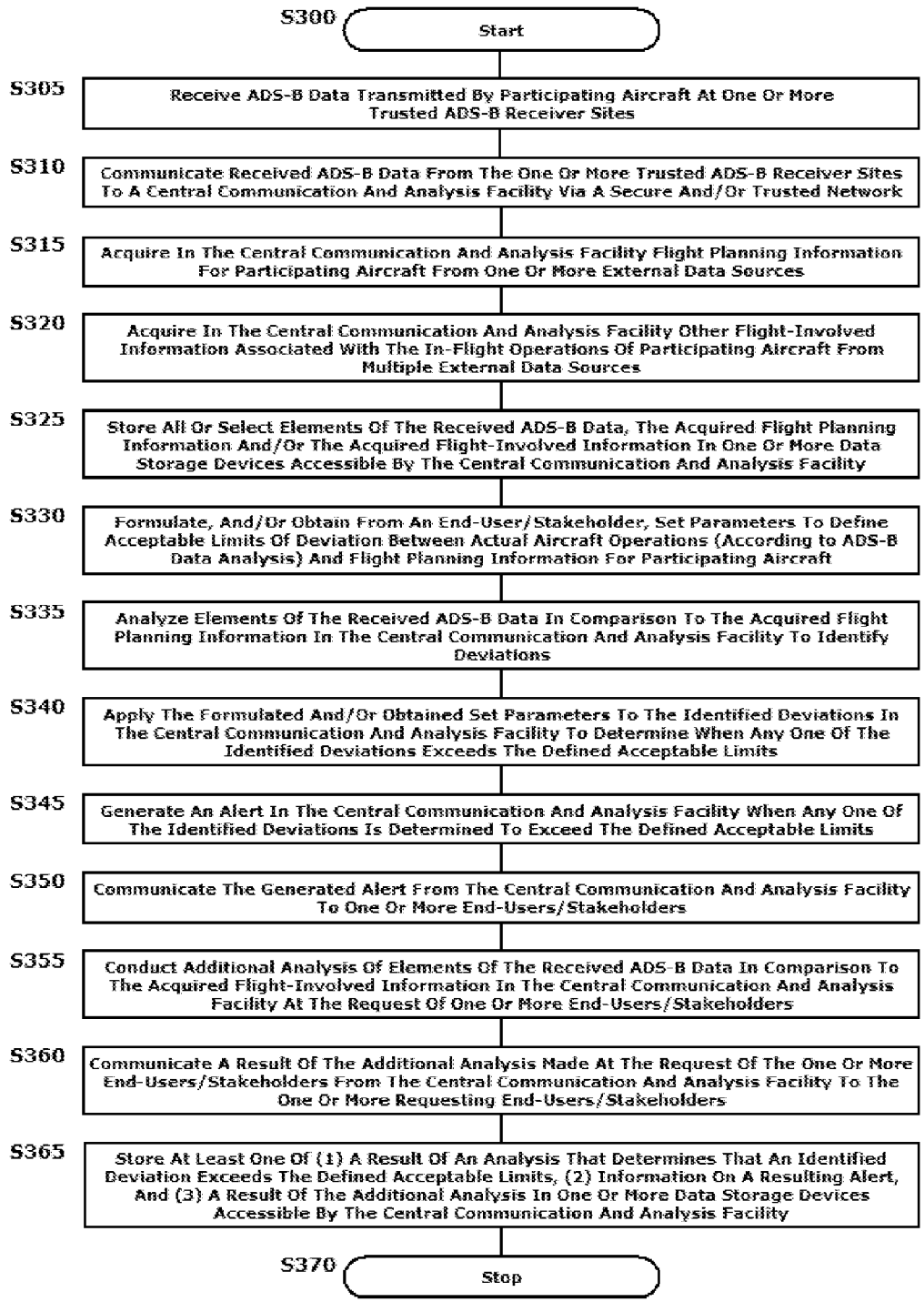
FIG. 3 illustrates a flowchart of an exemplary method for effecting the Trusted ADS-B data acquisition, integration, analysis and alerting schemes with regard to aircraft in flight worldwide according to this disclosure.

The disclosed embodiments may include an exemplary method for effecting the Trusted ADS-B data acquisition, integration, analysis and alerting schemes with regard to aircraft in flight worldwide. FIG. 3 illustrates a flowchart of such an exemplary method. As shown in FIG. 3, operation of the method commences at Step S300 and proceeds to Step S305.

In Step S305, ADS-B data transmitted by participating aircraft worldwide may be received at one or more trusted ADS the receiver sites controlled by, for example, a central communication and analysis facility. Operation of the method proceeds to Step S310.

In Step S310, the received ADS-B data may be communicated from the one or more trusted ADS-B receiver sites to the central communication and analysis facility via a secure and/or trusted communication network under the control of the central communication and analysis facility. Operation of the method proceeds to Step S315.

In Step S315, flight planning information for participating aircraft may be acquired in the central communication and analysis facility from one or more external data sources. Operation of the method proceeds to Step S320.

In Step S320, other flight-involved information associated with in-flight operations of participating aircraft may be required in the central communication and analysis facility from multiple external data. Operation of the method proceeds to Step S325.

In Step S325, all, or select elements, of the received ADS-B data, the required flight planning information and/or the acquired flight-involved information may be stored in one or more data storage devices in communication with and accessible by the central communication and analysis facility. Operation of the method proceeds to Step S330.

In Step S330, set parameters, which may define acceptable limits of deviation between actual aircraft operations (according to an analysis of the available ADS-B data) for a particular participating aircraft and flight planning information for the particular participating aircraft, may be formulated within the central communication and analysis facility, or may otherwise be obtained from a relevant end-user/stakeholder. In embodiments, the set parameters will be relevant to individual occurrences of deviation and/or discrepancy analysis according to the disclosed schemes. Operation of the method proceeds to Step S335.

In Step S335, elements of the received ADS-B data may be analyzed (or otherwise evaluated) in comparison to the acquired flight planning information in the central communication and analysis facility to identify deviations between the actual aircraft operations and the flight planning information. Operation of the method proceeds to Step S340.

In Step S340, once a deviation, or other discrepancy, is identified, the formulated and/or obtained set parameters may be applied to the identified deviation, or other discrepancy, in the central communication analysis facility to determine when anyone of the identified deviations, or other discrepancies, exceeds the acceptable limits defined by the set parameters. Operation of the method proceeds to Step S345.

In Step S345, an alert may be generated in the central communication and analysis facility when any one of the identified deviations is determined to exceed the defined acceptable limits. The generated alert may be usable locally by individuals within the central communication and analysis facility to initiate certain actions. Operation of the method proceeds to Step S350.

In Step S350, the generated alert may be otherwise communicated from the central communication and analysis facility to one or more end-users/or stakeholders. The communicated alert may be usable by the end-users/stakeholders to initiate certain actions in communication to the particular aircraft or otherwise in remediation of the identified deviation or other discrepancy that caused the alert to be generated. Operation of the method proceeds to Step S355.

In Step S355, additional analysis of elements of the received ADS-B data may be conducted in comparison, for example, to the acquired flight-involved information for a particular aircraft. This additional analysis may be conducted in the central communication and analysis facility at the request, for example, of one or more end-users/stakeholders. Operation of the method proceeds to Step S360.

In Step S360, a result of the additional analysis conducted at the request of the one or more end-users/stakeholders may be communicated from the central communication and analysis facility to the one or more requesting end-users/stakeholders. Operation of the method proceeds to Step S365.

In Step S365, at least one of (1) a result of an analysis to determine that an identify deviation exceeds the defined acceptable limits, (2) information on a resulting alert, and (3) a result of the additional analysis (or other like information that may be beneficial to track) may be stored in the one or more data storage devices accessible by the central communication and analysis facility. Operation of the method proceeds to Step S370, where operation of the method ceases.

The disclosed embodiments may include a non-transitory computer-readable medium storing instructions which, when executed by a processor, may cause the processor to execute all, or at least some, of the functions that may be appropriate to implement the steps of the method outlined above.

The above-described exemplary systems and methods reference certain conventional components and known data sources to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objectives of the systems and methods according to this disclosure.

Those skilled in the art will appreciate that other embodiments of the disclosed subject matter may be practiced in implementing an advanced aircraft flight following, deviation detection and alerting scheme based on an analysis of trusted ADS-B data using many and widely-varied system components, and combinations of such components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards, or other analog or digital data storage device that can be used to carry or store desired program elements or steps in the form of accessible computer-executable instructions or data structures. When information is transferred or provided over a network or another communication connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations.

The exemplary depicted sequence of executable instructions or associated data structures for carrying into effect the steps of the above method represent one example of a corresponding sequence of acts for implementing the functions described in the steps of the method. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual data collection and reporting event that may individually reliably employ components of the disclosed system for implementing the disclosed schemes. This enables, for example, each data exchange node to enjoy the benefits of the disclosed embodiments even if any one of the large number of possible data sources and/or end-user/stakeholder nodes do not need some portion of the described functionality. In other words, there may be multiple instances of the disclosed system each processing the content in various ways. It does not necessarily need to be one system used by all end-user/stakeholder nodes. Accordingly, the appended claims and their legal equivalents should only define the disclosed embodiments, rather than any specific examples given.

We claim:
1. A system for aircraft flight following, comprising:
a plurality of dispersed ADS-B data receiving nodes that are configured to receive ADS-B data transmitted by participating aircraft;

a data collection device in communication with the plurality of dispersed ADS-B data receiving nodes, the data collection device being configured to collect the ADS-B data received by the plurality of dispersed ADS-B data receiving nodes;

an information collection device that is configured to collect at least one of flight planning information and aircraft operating information for the participating aircraft from one or more information sources;

a data analysis device that is configured to compare elements of collected ADS-B data for a particular aircraft with the at least one of the flight planning information and the aircraft operating information for the particular aircraft to identify a difference between the collected ADS-B data and the collected information for the particular aircraft; and an output device that is configured to output a result of the analysis including the identified difference between the collected ADS-B data and the collected information for the particular aircraft.

2. The system of claim 1, the collected information for the particular aircraft being a flight plan for the particular aircraft, the data analysis device being configured to compare select elements of the collected ADS-B data for the particular aircraft with information in the flight plan for the particular aircraft during execution of the flight plan, and the identified difference between the collected ADS-B data and the collected information for the particular aircraft being an in-flight deviation from the route of flight specified in the flight plan.

3. The system of claim 2, the data analysis device being further configured to apply a set parameter to the in-flight deviation from the route of flight specified in the flight plan to determine when the in-flight deviation exceeds a threshold specified by the set parameter, and generate an alert via the output device that advises a user that the in-flight deviation is determined to exceed the threshold.

4. The system of claim 3, further comprising:

a communication link to a communication device controlled by a first end-user associated with operation of the particular aircraft; and a data storage device, the information collection device being further configured to receive the set parameter from the first end-user via the communication link, and to store the set parameter in the data storage device, the data analysis device being further configured to identify the first end-user based on elements of the collected ADS-B data for the particular aircraft, and to recover the stored set parameter from the data storage device, and the output device being further configured to output the result of the analysis by communicating the alert to the communication device controlled by the first end-user via the communication link.

5. The system of claim 4, the output device being further configured to format the alert for direct integration by the communication device controlled by the first end-user.

6. The system of claim 5, the communication device controlled by the first end-user comprising a graphical situational awareness display device.

7. The system of claim 1, further comprising:

a communication link to a communication device controlled by a second end-user, the second end-user requesting a particular comparative analysis between certain elements of the collected ADS-B data for a plurality of the participating aircraft operating in a specified airspace and the at least one of the flight planning information and the aircraft operating information in the specified airspace, the data analysis device being further configured to conduct the requested comparative analysis, and the output device being further configured to output a result of the requested comparative analysis to the communication device controlled by the second end-user via the communication link.

8. The system of claim 1, at least one of the plurality of the dispersed ADS-B data receiving nodes being an ADS-B receiver associated with an Aircraft Communications Addressing and Reporting System (ACARS) receiving node.

9. The system of claim 8, the ADS-B receiver being integrated in the ACARS receiving node.

10. The system of claim 1, at least one of the plurality of the dispersed ADS-B data receiving nodes being an ADS-B receiver mounted on a communication satellite.

11. The system of claim 1, further comprising a secure communication network that is configured to provide a communication link between the data collection device and the plurality of dispersed ADS-B data receiving nodes.

12. The system of claim 11, the data collection device, the information collection device, the data analysis device and the output device being housed in a central facility, and the secure communication network being a proprietary communication network controlled by the central facility.

13. A method for aircraft flight following, comprising:

collecting, with a processor, ADS-B data from a plurality of dispersed ADS-B data receiving nodes receiving ADS-B data transmitted by participating aircraft;

collecting, with the processor, at least one of flight planning information and aircraft operating information for the participating aircraft from one or more information sources;

comparing, with the processor, elements of the collected ADS-B data for a particular aircraft with the at least one of the flight planning information and the aircraft operating information for the particular aircraft to identify a difference between the collected ADS-B data and the collected information for the particular aircraft; and outputting, with the processor, a result of the analysis including the identified difference between the collected ADS-B data and the collected information for the particular aircraft.

14. The method of claim 13, the collected information for the particular aircraft being a flight plan for the particular aircraft, the comparing the elements of the collected ADS-B data for the particular aircraft with the information for the particular aircraft comprising comparing select elements of the collected ADS-B data for the particular aircraft with information in the flight plan for the particular aircraft during execution of the flight plan, the identified difference between the collected ADS-B data and the collected information for the particular aircraft being an in-flight deviation from the route of flight specified in the flight plan.

15. The method of claim 14, further comprising:
applying, with the processor, a set parameter to the in-flight deviation from the route of flight specified in the flight plan to determine when the in-flight deviation exceeds a threshold specified by the set parameter; and
generating, with the processor, an alert that advises a user that the in-flight deviation is determined to exceed the threshold.

16. The method of claim 15, further comprising:
communicating with a communication device controlled by a first end-user associated with operation of the particular aircraft;
receiving, with the processor, the set parameter from the first end-user;
storing the received set parameter in a data storage device;
identifying, with the processor, the first end-user based on elements of the collected ADS-B data for the particular aircraft;
recovering, with the processor, the stored set parameter from the data storage device; and
outputting, with the processor, the result of the analysis by communicating the alert to the communication device controlled by the first end-user.

17. The method of claim 16, further comprising formatting, with the processor, the alert for direct integration by the communication device controlled by the first end-user.

18. The method of claim 13, further comprising:
communicating with a communication device controlled by a second end-user to receive a request for a particular comparative analysis between certain elements of the collected ADS-B data for a plurality of the participating aircraft operating in a specified airspace and the at least one of the flight planning information and the aircraft operating information in the specified airspace;
conducting, with the processor, the requested comparative analysis; and
outputting, with the processor, a result of the requested comparative analysis to the communication device controlled by the second end-user.

19. The method of claim 13, further comprising storing at least one of
(1) the collected ADS-B data received by the plurality of dispersed ADS-B data receiving nodes, and (2) the result of the requested comparative analysis in a data storage device.

20. The method of claim 13, the collecting the ADS-B data from the plurality of dispersed ADS-B data receiving nodes comprising communicating with the plurality of dispersed ADS-B data receiving nodes via a secure communication network that provides a communication link between a central facility and the plurality of dispersed ADS-B data receiving nodes.

21. The method of claim 20, the central facility controlling the collecting the ADS-B data, the collecting the at least one of the flight planning information and the aircraft operating information, the comparing the elements of the collected ADS-B data, and the outputting the result of the analysis, and
the secure communication network being a proprietary communication network controlled by the central facility.

22. A non-transitory data storage medium storing instructions that, when executed by a processor, cause the processor to execute the steps of a method for aircraft flight following, the method comprising:
collecting ADS-B data from a plurality of dispersed ADS-B data receiving nodes receiving ADS-B data transmitted by participating aircraft;
collecting at least one of flight planning information and aircraft operating information for the participating aircraft from one or more information sources;
comparing elements of the collected ADS-B data for a particular aircraft with the at least one of the flight planning information and the aircraft operating information for the particular aircraft to identify a difference between the data and the information; and
outputting a result of the analysis including the identified differences between the collected ADS-B data and the collected information for the particular aircraft.

* * * * *